Oct. 21, 1969 R. M. GUSTAFSON 3,474,422

MAGNETIC CORE MEMORY ARRAY CONSTRUCTION

Filed June 30, 1965 2 Sheets-Sheet 1

INVENTOR
ROBERT M. GUSTAFSON

BY Carl C. Kling
ATTORNEY

MAGNETIC CORE MEMORY ARRAY CONSTRUCTION

Filed June 30, 1965

3,474,422

MAGNETIC CORE MEMORY ARRAY CONSTRUCTION

Robert M. Gustafson, Poughkeepsie, N.Y., assignor to International Business Machines Corporation, Armonk, N.Y., a corporation of New York Filed June 30, 1965, Ser. No. 468,247
Int. Cl. G11b 5/00
U.S. Cl. 340—174 4 Claims

ABSTRACT OF THE DISCLOSURE

This invention relates to magnetic core memory arrays and is directed more particularly to a structural arrangement adapted for automatic production of such arrays and to a fabrication method for such arrays.

Magnetic core memory arrays are well known in the art and have the form of a lattice of magnetic cores in which the cores have two well defined extremes of magnetization for representing two values necessary to store binary numbers. Windings are threaded or plated through each core to control and sense the magnetic state of each core.

It has become necessary to build larger capacity magnetic core memory arrays in order to meet industrial demands for high capacity, high speed information storage. As the capacity of these arrays has increased, it has become necessary to decrease the physical size of the circuit elements including the cores themselves in order to reduce the size of these large capacity arrays and hence retain compact computer equipment. As the size of the elements of the arrays has decreased, it has become increasingly difficult to manufacture the memory arrays in a rapid and economic manner.

Heretofore, some magnetic core memory arrays have been assembled with a plurality of windings threaded through the cores so as to support the cores. This technique of assembly has become increasingly time consuming and expensive because of the great number of wires which must be threaded through the small apertures of the magnetic cores. A further prior art technique is to provide a structural member which supports a plurality of cores in a single plane. This may be automatically achieved in a variety of ways. In one technique, the cores are placed within apertures of a plate or plane, and staples are inserted through the cores to hold the cores in place. These staples are then utilized as windings. This technique becomes quite difficult and impracticable as smaller sized cores are used because the stapling mechanism must be a precise instrument to thread the staple through the small aperture and the staple itself must be of a very small diameter wire that will not break when deformed.

Another prior art approach is to imbed the cores within a laminate structure. Windings are then both plated through the cores and threaded through the cores to form a complete magnetic core array. This type of laminate structure forms an ideal supporting member for the cores. However, it does not lend itself readily to economic automatic manufacture.

Prior art methods of manufacture of laminated memory structures can be classified into two categories. The first category includes those methods of manufacture wherein the laminate structure is built up around the cores. That is, the cores are set in place on a first layer, a second layer of material in its liquid state is then poured around the cores and allowed to solidify so as to bond the cores in place. This first prior art method of manufacture using a laminate structure requires that the cores be exactly placed by some locating means, and it is time consuming in that the locating means must be precisely located with respect to both the cores and the laminate structure and cannot be withdrawn until the liquid layer has solidified.

The second category of manufacture of laminated memory structures includes those methods wherein the cores are glued in place. That is, the cores are set in apertures located within the first layer, a bonding agent is then applied to bond the cores in place, and then a second layer is usually applied so as to cover the tops of the cores. This second prior art method is also time consuming in that the bonding agent must be exactly applied because the core must be sealed against possible spurious conductive paths during subsequent plating operations when windings are thereafter plated through the cores.

As mentioned above, wire windings are sometimes threaded through the cores located in a laminate structure. As the size of the cores has decreased, the threading of these wires has become increasingly difficult and expensive. It has thus been a prior art problem to thread these wire windings through apertures of the laminate supporting structure and hence through the cores.

Accordingly, it is an object of this invention to assemble a multi-layer magnetic core plane with cores bonded in place by an improved, economical, and high-speed process.

It is a further object of this invention to assemble in an improved manner a magnetic core plane with cores bonded in place from a preformed laminate structure.

An additional object of this invention is, in an improved manner, to bond magnetic cores in place in a multi-layer magnetic core plane and seal the cores to insure against possible spurious conductive paths during subsequent plating operations.

An additional object is to provide a magnetic core memory package which lends itself readily to automatic manufacture in an economical and high-speed process.

A further object is to facilitate the threading of core winding wires through the cores of a magnetic core memory package.

The above and further objects of the present invention are carried out by first placing the magnetic cores into apertures located within a preformed multi-layer laminate structure. This preformed laminate structure has a conductive layer and a thermoplastic layer disposed thereon. This multi-layer laminate structure has apertures formed therein to receive the cores. After the cores have been placed in the apertures of the laminate structure, the laminate structure is heated at a temperature and pressure which causes the thermoplastic layer to deform and bond and seal the cores in place. Windings can then be plated from one conductive layer through a core, there being no chance for spurious conductive paths to be formed adjacent to the outer surface of the core during the plating operation as the core is sealed in the thermoplastic layer. Additional wire windings may then be threaded through the magnetic core memory plane through each core. In order to facilitate the threading of these wires, funnel shaped openings are formed in the outer-most layer of the multi-layer laminate structure. Thus, the wire is threaded through the wide diameter portion of the funnel shaped opening first and directed by the geometry of the funnel and the force exerted on the wire through the core aperture and laminate structure.

The foregoing and other objects, features and advantages of the invention will be apparent from the following more particular description of a preferred embodiment of the invention, as illustrated in the accompanying drawings.

Figure 1:
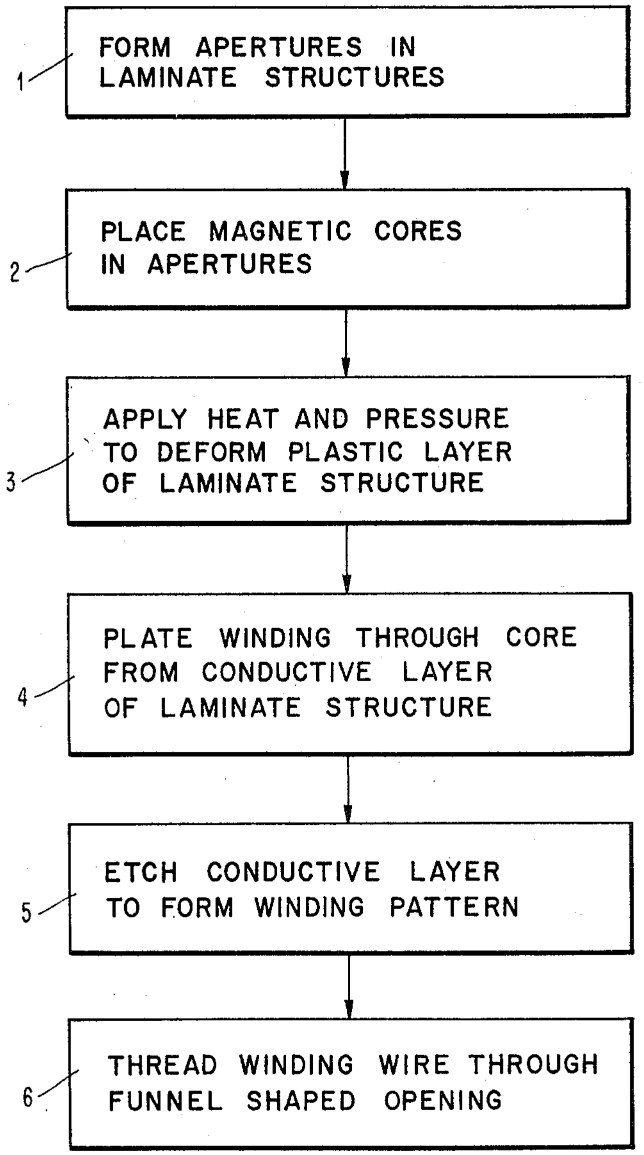
FIG. 1 is a block diagram showing the process steps of manufacturing a magnetic core memory array structure in accordance with the present invention.

The novel steps for constructing a magnetic core memory array are outlined in the block diagram of FIG. 1. Before describing the process steps set forth in FIG. 1, reference is made to FIG. 7 for a general description of a magnetic core memory array made by the process. It can be seen that the magnetic core memory array of FIG. 7 comprises a plurality of laminate core planes 20 assembled in spaced relationship with one another. Each laminate core plane consists of a thermoplastic layer 26 and a conductive layer 30. Each laminate core plane has a plurality of magnetic cores 32 embedded therein. Winding wires 38 are threaded through the cores 32 and apertures 36 and 34 of each laminate core plane. Aperture 34 is funnel shaped to facilitate the threading of the winding wires 38.

Referring now to step 1 of FIG. 1, apertures are first formed in each laminate core plane. While these apertures could be formed in some or all of the layers of a laminate structure prior to forming the laminate structure, they are formed in the laminate structure after it is assembled in the preferred embodiment.

The next process step 2 consists of placing the magnetic cores in the apertures. The cores can be put into the apertures in a variety of ways, one of which is to place a large number of cores which exceed the number of apertures on the top surface of the laminate structure and to vibrate the laminate structure so as to shake the cores into place in the apertures. Excess cores can then be removed with an adhesive surface or any other well known techniques.

As shown by step 3, heat and pressure are next applied to the laminate core plane to cause the thermoplastic layer to deform and flow adjacent to the core. Upon cooling, the thermoplastic will bond the cores in place and seal the outer surface of the cores so that spurious conductive paths will not develop during subsequent plating operations.

As shown by step 4, windings are then plated through the cores from the conductive layer of the laminate structure. These windings will control and/or sense the magnetic state of each core when the memory array is used.

As shown by step 5, the conductive layer is then etched to form a complete winding.

As seen by step 6, the winding wires are then threaded through the funnel shaped openings of the laminate core plane.

Figure 2:
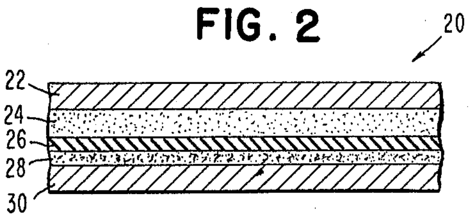
FIG. 2 is a cross sectional view of a laminate core plane prior to being formed into a magnetic core memory plane by the novel process.

Referring now to FIG. 2, the preferred embodiment of the laminate core plane is shown prior to its being formed into a complete magnetic core memory plane by the novel process described above. The laminate core plane 20 comprises an upper conductive layer 22 and a lower conductive layer 30. The conductive layer provided is a copper layer 1.4 mils in thickness. However, it is recognized that other conductive materials of varying thicknesses can be used. The upper conductive layer 22 is bonded to a polyethylene terephthalate layer 26 by a thermoplastic adhesive layer 24. The thermoplastic adhesive layer 24 is one which is capable of deforming and flowing under pressure and heat. An example of such a material is a polyamide resin derived from the condensation product of dimeric fatty acid with polyamines. The lower conductive layer 30 is bonded to the polyethylene terephthalate layer 26 by an adhesive layer 28 which deforms at a relatively high temperature as compared with the thermoplastic adhesive layer used. The adhesive layer provided is a polyester derived from the condensation product of a mixture of terephthalic and isophthalic acids and ethylene glycol cured with an isocyanate terminated urethane trimer. In the preferred embodiment, the polyethylene terephthalate layer 26 is three mils in thickness, the thermoplastic adhesive layer 24 is one mil in thickness, and the adhesive layer 28 is ½ mil in thickness. However, it is recognized that layers of other thicknesses can be successfully used.

Figure 3:
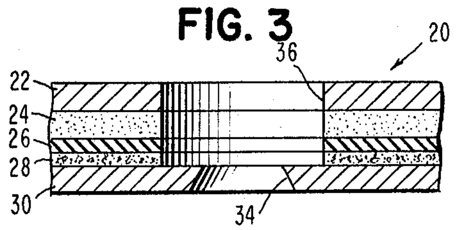
FIG. 3 is a cross sectional view of a laminate core plane after apertures have been formed therein.

Referring now to FIG. 3, apertures 36 are formed in the laminate structure. They are formed in the preferred embodiment by etching the upper copper layer 22 with a thirty Baumé solution of ferric chloride. The thermoplastic adhesive layer 24, the polyethylene terephthalate layer 26, and the adhesive layer 28 are then etched with a concentrated sulphuric acid solution at 110° F. The aperture is then cleaned with an ultrasonic bath in trichlorethylene. It is recognized, however, that the apertures 36 can be formed by using other etching techniques and etchants. They could also be formed by a mechanical drilling type operation.

Figure 7:
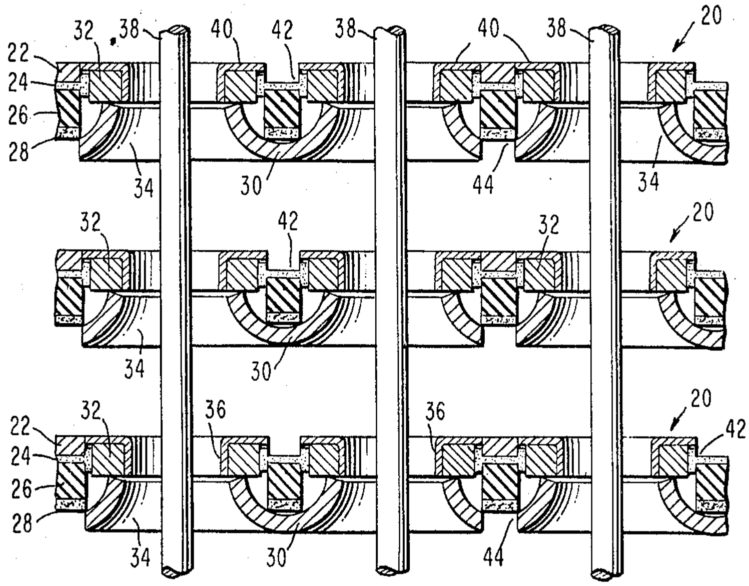
FIG. 7 is a sectional view taken along the line 7—7 of FIG. 6 showing the stacked relationship of the laminate core planes.

The funnel shaped opening 34 formed in the lower copper layer 30 is made by deliberately side etching the copper with a chromic acid solution. In the preferred embodiment, the apertures 36 are thirteen mils in diameter. The narrowest diameter of the funnel shaped aperture 34 is seven mils in diameter which is equal to the inside diameter of the cores. Of course, the narrowest diameter of the funnel shaped opening could be smaller than the inside diameter of the cores. It could also be larger than the inside diameter of the cores if the cores are chamfered so as to retain an overall funnel shaped opening. The funnel shaped opening of the lower conductive layer 30 could also be formed by a punching operation. Referring now to FIG. 7, it can be seen that the conductive layer 30 has been drawn upward so as to form a funnel shaped opening 34.

Figure 4:
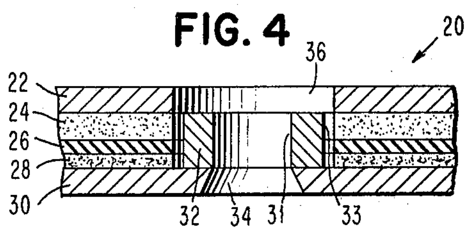
FIG. 4 is a cross sectional view of a laminate core plane after magnetic cores have been placed in the apertures.

Referring now to FIG. 4, a cross section of the laminate structure is shown after the cores 32 have been put into the apertures. It is seen that the core 32 rests on the lower conductive layer 30. The outer diameter of the core 32 is smaller than the diameter of the aperture 36 so that a space 35 exists between the outer surface 33 of the core and the laminate structure. In the preferred embodiment, the outer diameter of the core is twelve mils while the diameter of the aperture is thirteen mils. After the cores have been put into place, heat and pressure is applied to the laminate structure causing the thermoplastic adhesive layer 24 to deform and flow. The thermoplastic flows into the space 35 that exists between the outer surface of the core 33 and the aperture 36.

Figure 5:
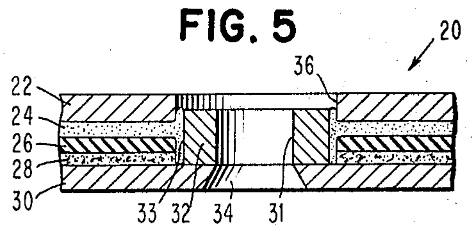
FIG. 5 is a cross sectional view of a laminate core plane after the thermoplastic adhesive layer has flowed to bond and seal the cores in place.

Referring now to FIG. 5, it is seen that the thermoplastic layer 24 has flowed about the core at 23. Upon cooling, the thermoplastic adhesive layer 24 will bond the core 32 in place. The presence of the thermoplastic adhesive as shown at 23 prevents other materials from occupying the same space that the thermoplastic adhesive occupies and thereby forms an insulating layer about the circumference of the core. Thus, during subsequent plating operations, conductive material which is plated through the inner surface 31 of the core will not occupy space adjacent to the outer surface 33 of the core and thereby create spurious conductive paths from the lower conductive layer 30 to the upper conductive layer 22. Hence, during subsequent plating operations, unwanted electrical paths will not be formed along the outside surface 33 of the cores 32.

In the preferred embodiment, the polyamide resin flows when the laminate is heated to a temperature of about 265° F. for 20 minutes. The pressure applied during the heating operation is very slight, in the order of one pound per square inch. Although polyethylene terephthalate normally distorts at this temperature, the polyethylene terephthalate layer 26 will not distort since one side of it is bonded by an adhesive layer 28 which does not flow in the temperature range in which the thermoplastic adhesive is heated. This bond stabilizes the polyethylene terephthalate layer while the thermoplastic adhesive layer 24 flows. The lower conductive layer acts as a heat sink to carry away heat from the adhesive layer 28 and the core 32.

Referring now to FIG. 7, windings 40 are next plated through the cores from the lower conductive layer to the upper conductive layer of the laminate core plane. In the preferred embodiment, electroless copper is applied to connect the two conductive layers through the cores. Additional electrolytic copper is then plated on the cores.

Figure 6:
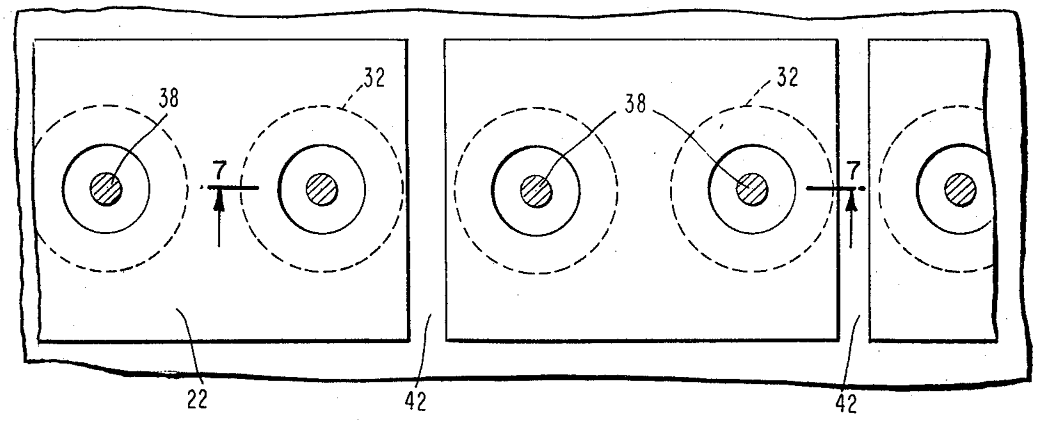
FIG. 6 is a partial top plan view of a magnetic core memory array structure, constructed in accordance with the present invention.

The conductive layers are then etched to form a winding pattern. The upper layer is etched away at 42 while the lower layer is etched away at 44. This can also be seen in the top view shown in FIG. 6.

Referring again to FIG. 7, the laminate core planes 20 are next assembled in stacked relationship. They can be spaced so that ony a thin insulating layer separates adjacent core planes. Winding wires 38 are then threaded through the laminate core planes. The wires can be insulated wires or the insulation may be applied to the laminate structure in order to insulate the winding wires 38 from the plated winding 40. The winding wires are threaded from the lower layer 30 of each laminate core plane through the funnel shaped opening 34, through the magnetic cores 32, and through the aperture 36. The funnel shaped opening 34 in the lower conductive layer 30 of each laminate core plane facilitates the threading of the winding wire 38. This is because the aperture at the outer surface of the lower conductive layer 30 has a larger diameter than the inner diameter of the core. It is easier to thread the wire through the larger aperture since the larger opening is easier to locate than the smaller opening of the core. The walls of the aperture 34 being funnel shaped direct the wire to the aperture of the core.

While the invention has been particularly shown and described with reference to a preferred embodiment thereof, it will be understood by those skilled in the art that various changes in form and details may be made therein without departing from the spirit and scope of the invention.

What is claimed is:

1. A magnetic core memory package having a multi-layer laminate core plane with cores bonded therein, said multi-layer laminate core plane consisting of an upper conductive layer, a lower conductive layer, a polyethylene terephthalate layer disposed intermediate said upper conductive layer and said lower conductive layer, a thermoplastic adhesive layer disposed between said upper conductive layer and said polyethylene terephthalate layer and bonding said upper conductive layer to said polyethylene terephthalate layer, and an adhesive layer disposed between said conductive layer and said polyethylene terephthalate layer and bonding said lower conductive layer to said polyethylene terephthalate layer;

said lower conductive layer including a funnel shaped opening contiguous to an adjacent core which facilitates threading of core winding wires through the cores.

2. A magnetic core memory package as in claim 1 wherein the lower conductive layer has a flow temperature higher than said thermoplastic adhesive layer.

3. A magnetic core memory package having a multi-layer laminate core plane with cores bonded therein, said multi-layer laminate core plane consisting of an upper conductive layer, a lower conductive layer, a polyethylene terephthalate layer disposed intermediate said upper conductive layer and said lower conductive layer, a thermoplastic adhesive layer disposed between said upper conductive layer and said polyethylene terephthalate layer and bonding said upper conductive layer to said polyethylene terephthalate layer, and an adhesive layer disposed between said conductive layer and said polyethylene terephthalate layer and bonding said lower conductive layer to said polyethylene terephthalate layer.

4. A magnetic core memory package as in claim 3 wherein the lower conductive layer has a flow temperature higher than said thermoplastic adhesive layer.

References Cited

UNITED STATES PATENTS

| | | | |
|---|---|---|---|
| 3,130,134 | 4/1964 | Jones | 340—174 |
| 3,184,719 | 5/1965 | Perkins | 340—174 |
| 3,206,732 | 9/1965 | Briggs | 340—174 |
| 3,214,743 | 10/1965 | Heidler et al. | 340—174 |
| 3,317,408 | 5/1967 | Barnes et al. | 340—174 |

STANLEY M. URYNOWICZ, Jr., Primary Examiner

B. L. HALEY, Assistant Examiner

U.S. Cl. X.R.

29—604